(12) United States Patent
Dujari

(10) Patent No.: US 6,272,593 B1
(45) Date of Patent: Aug. 7, 2001

(54) DYNAMIC NETWORK CACHE DIRECTORIES

(75) Inventor: Rajeev Dujari, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/058,982

(22) Filed: Apr. 10, 1998

(51) Int. Cl.[7] .................................................. G06F 12/00
(52) U.S. Cl. ........................ 711/118; 713/200; 713/201; 707/10
(58) Field of Search .................................... 711/118, 205, 711/158, 163; 713/200–201; 707/10

(56) References Cited

U.S. PATENT DOCUMENTS

| | | | | |
|---|---|---|---|---|
| 3,985,998 | * | 10/1976 | Crafton | 235/380 |
| 5,390,318 | * | 2/1995 | Ramakrishnan et al. | 711/158 |
| 5,442,760 | * | 8/1995 | Rustad et al. | 712/215 |
| 5,628,015 | * | 5/1997 | Singh | 713/200 |
| 5,737,599 | | 4/1998 | Rowe et al. | 707/104 |
| 5,787,470 | | 7/1998 | DeSimone et al. | 711/124 |
| 5,787,475 | | 7/1998 | Pawlowski | 711/137 |
| 5,863,207 | * | 1/1999 | Powell | 434/352 |
| 5,864,852 | * | 1/1999 | Luotonen | 713/201 |
| 5,889,958 | | 3/1999 | Willens | 709/229 |
| 5,991,760 | * | 11/1999 | Gauvin et al. | 707/10 |
| 6,061,715 | | 5/2000 | Hawes | 709/203 |
| 6,067,565 | | 5/2000 | Horvitz | 709/128 |
| 6,085,226 | | 7/2000 | Horvitz | 709/203 |
| 6,112,231 | | 8/2000 | DeSimone | 709/213 |

* cited by examiner

Primary Examiner—Do Hyun Yoo
Assistant Examiner—Nasser Moazzami
(74) Attorney, Agent, or Firm—Michalik & Wylie PLLC (57) ABSTRACT

A system and method for virtually eliminating a potential security risk inherent with the caching of network content. Random subdirectory names are generated for cache directories, while continuing to generate user-friendly file names. Security is achieved since malicious sites cannot guess the cache location, which if guessed along with the filename, could cause a user connected to the site to inadvertently execute malicious content downloaded by the site to the cache. In addition to generating random subdirectory names, the system and method provide enhanced performance by balancing the number of files among the cache directories, and by limiting the number of files in any cache directory by creating additional cache directories as needed.

28 Claims, 6 Drawing Sheets

URL      Cache Code: Filename

| HTTP: Reference 1 | 0:FilenameA |
| HTTP: Reference 2 | 2:FilenameB |
| HTTP: Reference 3 | 0:FilenameC |
| HTTP: Reference 4 | 1:FilenameD |
| HTTP: Reference 5 | 2:FilenameE |
| HTTP: Reference 6 | 3:FilenameF |
| HTTP: Reference 7 | 0:FilenameG |
| HTTP: Reference 8 | 0:FilenameH |
| ⋮ | ⋮ |
| HTTP: Reference $_n$ | 3:Filename$_n$ |

URL to Cache:Filename Table — 70

FIG. 4

| Index (Cache Code) | Cache Name | Number of Files in Cache |
|---|---|---|
| 0 → | XDF53GBI | 345 |
| 1 → | H3A38LPR | 329 |
| 2 → | GFS7SG6J | 344 |
| 3 → | L455W8S4 | 334 |
| ⋮ | ⋮ | ⋮ |

Cache Index — 78

DYNAMIC NETWORK CACHE DIRECTORIES

FIELD OF THE INVENTION

The invention relates generally to computer systems and networks, such as intranets and the Internet, and more particularly to reducing security risks of cached network content without compromising usability.

BACKGROUND OF THE INVENTION

For network client applications, such as web browsers, a limiting performance factor is often low bandwidth to the server. To mitigate this low-bandwidth problem, network client applications often cache content replicated from servers, so that as much information as possible is kept available on the client user's hard drive. To cache content, the local machine generates a filename from the content's URL (Uniform Resource Locator) and stores the file in a cache directory (folder). As data access times from the hard drive are typically orders of magnitude faster than download times, some or all of a server's content may often be rapidly accessed from the cache with little or no downloading of data from the server. In the extreme case, the computer or server may be offline from the network, in which case the cache may still provide some version of the content. Note that caching operations are automatic and invisible to the user, and thus no security checks (e.g., code signing verification) are immediately performed on the downloaded content. However, content that is cached is harmless unless opened.

While content caching thus provides substantial performance improvements, a big security problem is that a malicious web site may easily guess the default location of the cache and the filename generated for a given URL. By including a page with an embedded http: reference to a virus or other malicious program, the malicious site causes the virus/malicious program to be automatically downloaded to the cache. The site and/or page may also embed a guessed file: reference to the cache location of the virus. Note that normal security checks are carried out if the user invokes the http: reference, since the operating system recognizes the content as coming from a server. However, if the user invokes the guessed file: reference, (e.g., by clicking a corresponding location on the page or in some other manner), the operating system treats this as any other local file in the file system, thus executing or opening the virus/malicious program. As can be readily appreciated, normal code signing verification techniques applied to downloaded programs may be bypassed in this manner.

By way of example, assume via an embedded http: reference such as http://server/virus.exe, a malicious site places a hypothetical file named "virus.exe" in a user's cache directory named (e.g., by default) "C:\Windows\Temporary Internet Files\Cache2". If the site correctly guesses this file and location, the malicious site may include a file: reference, i.e., "file://c:\windows\Temporary Internet Files\Cache2\virus.exe" on the same (or even another) page. When the user invokes this file: reference, the virus program is executed.

Some contemporary web browsers solve this security problem by generating random filenames for cached files, whereby to be able to invoke the file via a corresponding file: reference, the site would have to guess the filename from an extremely large number of permutations. However, this has the drawback that applications (e.g., Microsoft Word) which are invoked from valid downloaded content will display and may even remember the random file names, confusing users.

SUMMARY OF THE INVENTION

Briefly, the present invention provides a system and method of storing content in a cache in a manner that makes it virtually impossible for a site to guess the cache location. To this end, random subdirectory names are generated for one or more caches, and randomly-named cache directories are created from the random subdirectory names. When content is downloaded from a server, the content is stored as one or more files in one of the randomly-named cache directories. In addition to generating random subdirectory names, the system and method provide for enhanced file system performance by balancing the number of files among the cache directories, and by limiting the number of files in any cache directory by creating additional cache directories as needed.

Other advantages will become apparent from the following detailed description when taken in conjunction with the drawings, in which:

DETAILED DESCRIPTION

Exemplary Operating Environment

Figure 1:
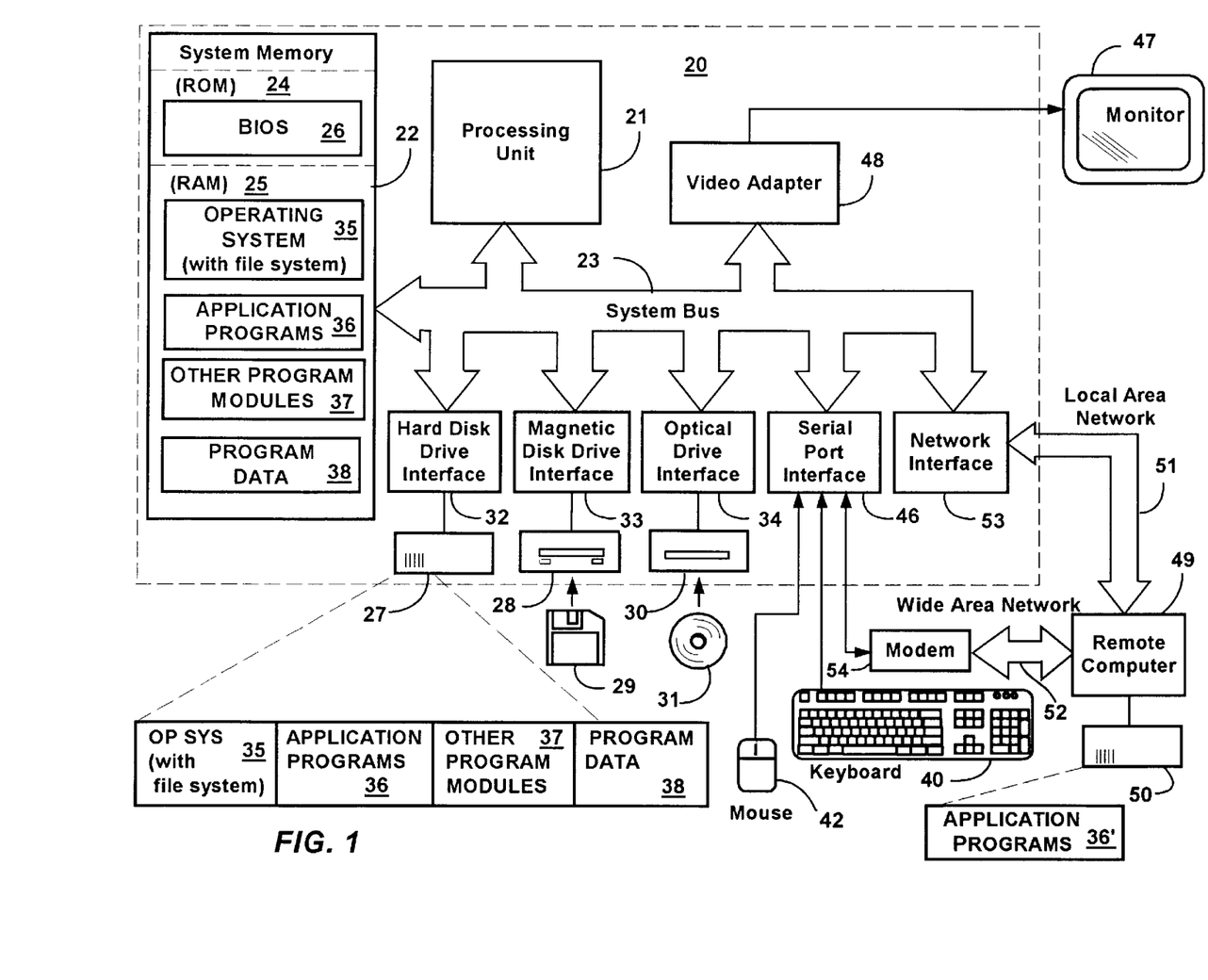
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Dynamic Network Cache Directories

Figure 2:
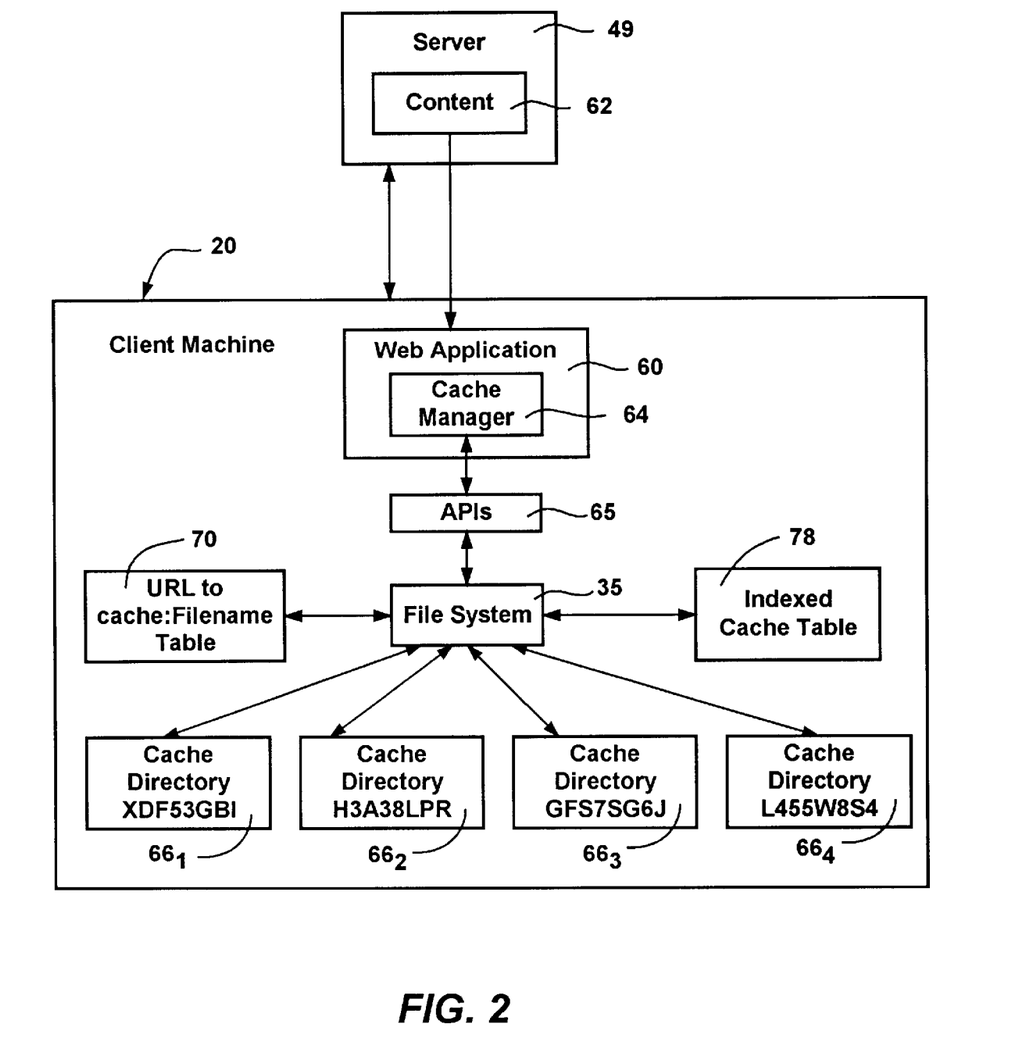
FIG. 2 is a block diagram representing a general conceptual model of the present invention.

FIG. 2 shows a generalized conceptual model of the present invention wherein a network application 60 such as a browser in a client machine (e.g., the personal computer system 20) communicates with a server (e.g., the remote computer 49) in order to download content 62 therefrom. Communication between the client 20 and the server 49 may take place using one of several well-known network protocols, such as hypertext transfer protocol (HTTP), file transfer protocol (FTP), Common Internet File System (CIFS) protocol, or Gopher, although for purposes of simplicity, the invention will be primarily described with respect to HTTP. Content available through these protocols may also be downloaded from the server to the client by alternative means, such as a multicast protocols or CD-ROM installation, for example. As used herein, "server" or "network server" includes any machine or combination of machines having content thereon. Network servers may thus include http "web sites," including those having sites with different names (which may be regarded as different virtual servers even if they are hosted on the same physical machine). Note that a web site may be distributed over many virtual servers, which in turn may be distributed over many physical machines.

In any event, the network application 60 includes or otherwise accesses a cache manager component 64 that includes code for caching some or all of the content 62, ordinarily via application programming interface (API) calls through APIs 65 to the operating/file system 35. Each distinctly-referenced portion of a server's content 62 is stored as a file in one or more cache directories $66_1$–$66_n$. Note that some or all of the various components referenced herein may be combined with or included within other components, while others may be separate from one another and be appropriately invoked as needed. For example, the cache manager component 64 may be part of the network application 60 (e.g., browser) code, or may be a separate component, (e.g., object, dynamic link library function and so on) that other network applications may call on.

Figure 3:
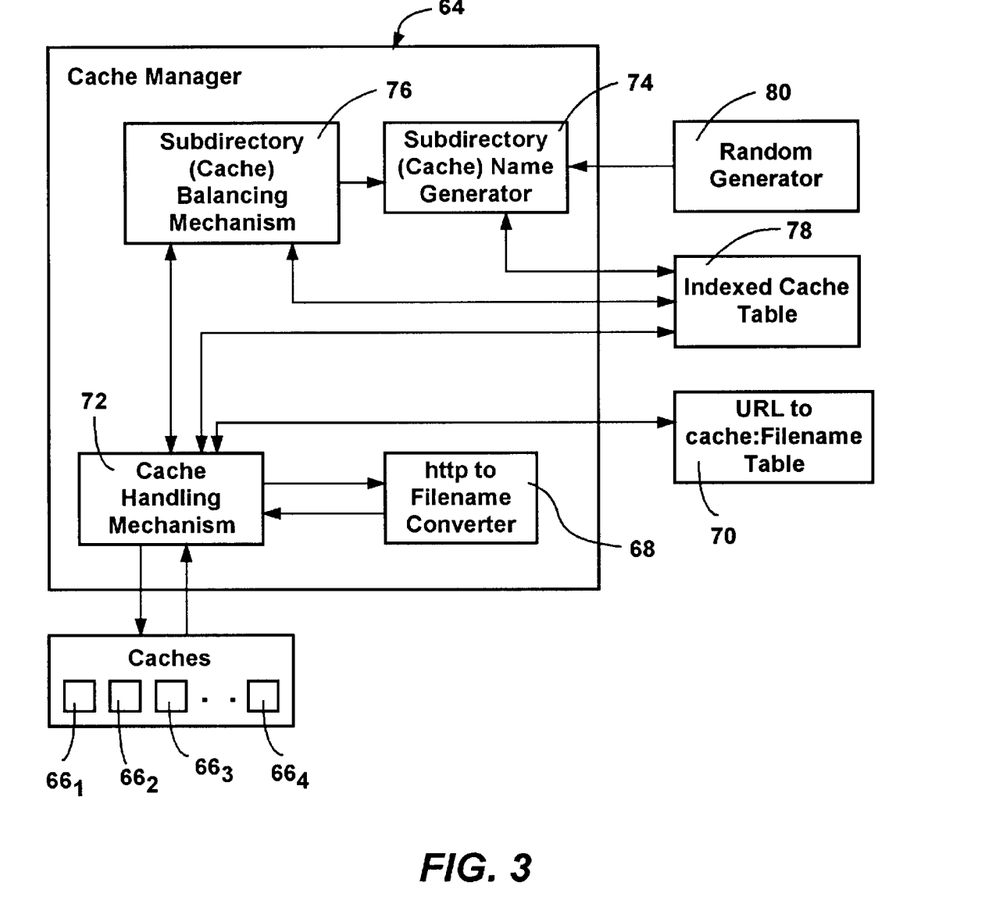
FIG. 3 is a block diagram generally representing various components for implementing the method and system of the present invention.
Figure 4:
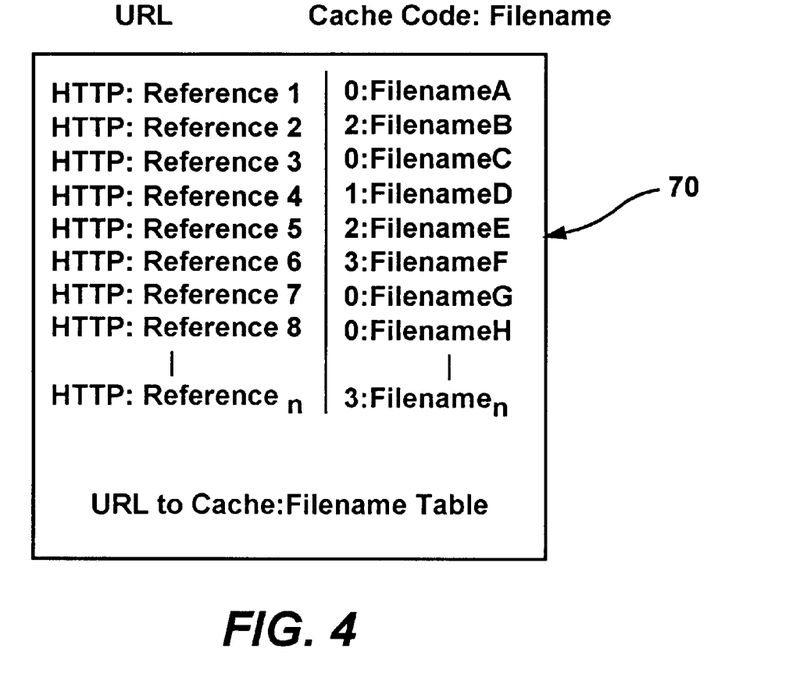
FIG. 4 is a representation of a table maintained for relating site references to locations and names of locally cached files.

To store and retrieve cached files, as shown in FIG. 3 the cache manager component 64 includes a mechanism 68 for converting server references (URLs) to local file system filenames. Although URL names and the like provided by servers often resemble filenames, certain characters in the URL name may not be allowed in a particular file system, and thus the converter 68 substitutes appropriate characters as necessary. Also, the name may be decorated, say by a appending a number, to distinguish it from a file or a similar but different URL. Note that the converter could generate random file names, however from the user's viewpoint, the use of user-friendly file names provides many advantages over randomized filenames, and thus the preferred converter attempts to match names as closely as possible to their URL names. In any event, after converting the names to corresponding file names, the server references and their corresponding local filenames are maintained in a table 70 (FIG. 4) or the like. As described in more detail below, the table 70 facilitates the use of multiple cache directories.

As shown in FIG. 3, the cache manager 64 further includes a cache handling mechanism 72 to facilitate caching operations, including creating and removing files and directories, and opening, reading and writing files. To this end, the cache handling mechanism 72 uses the filename table 70 and/or the converter mechanism 68 as needed to determine appropriate file names for interfacing with file system APIs.

In accordance with one aspect of the present invention and as generally represented in FIG. 3, the cache manager component 64 generates random subdirectory names for the caches $66_1$–$66_n$. To this end, the cache manager 64 includes (or accesses) code referred to herein as a subdirectory name generator component 74. At a time when no cache exists or when one or more additional caches are needed (as described below), the subdirectory name generator component 74 along with a cache balancing mechanism 76 (as also described below) determines how many (possibly additional) caches to create, creates that many caches (cache directories), and indexes the caches in a cache index table 78, also described below. In this manner, any number of caches may be created. To generate the random names of the cache subdirectories, the subdirectory name generator component 74 obtains random numbers from a random number generator 80, converts each random number to an alphanumeric character, and assembles a name from those alphanumeric characters. The subdirectory name generator component 74 also stores the subdirectory names in the indexed cache table 78 so that the cache directories may be efficiently represented by an index number, (e.g., a single byte or word, depending on how many caches are allowed), and thus quickly located. Furthermore, the indexing table may allow the cache directory names to be changed efficiently even after the directories have been created.

Figure 5:
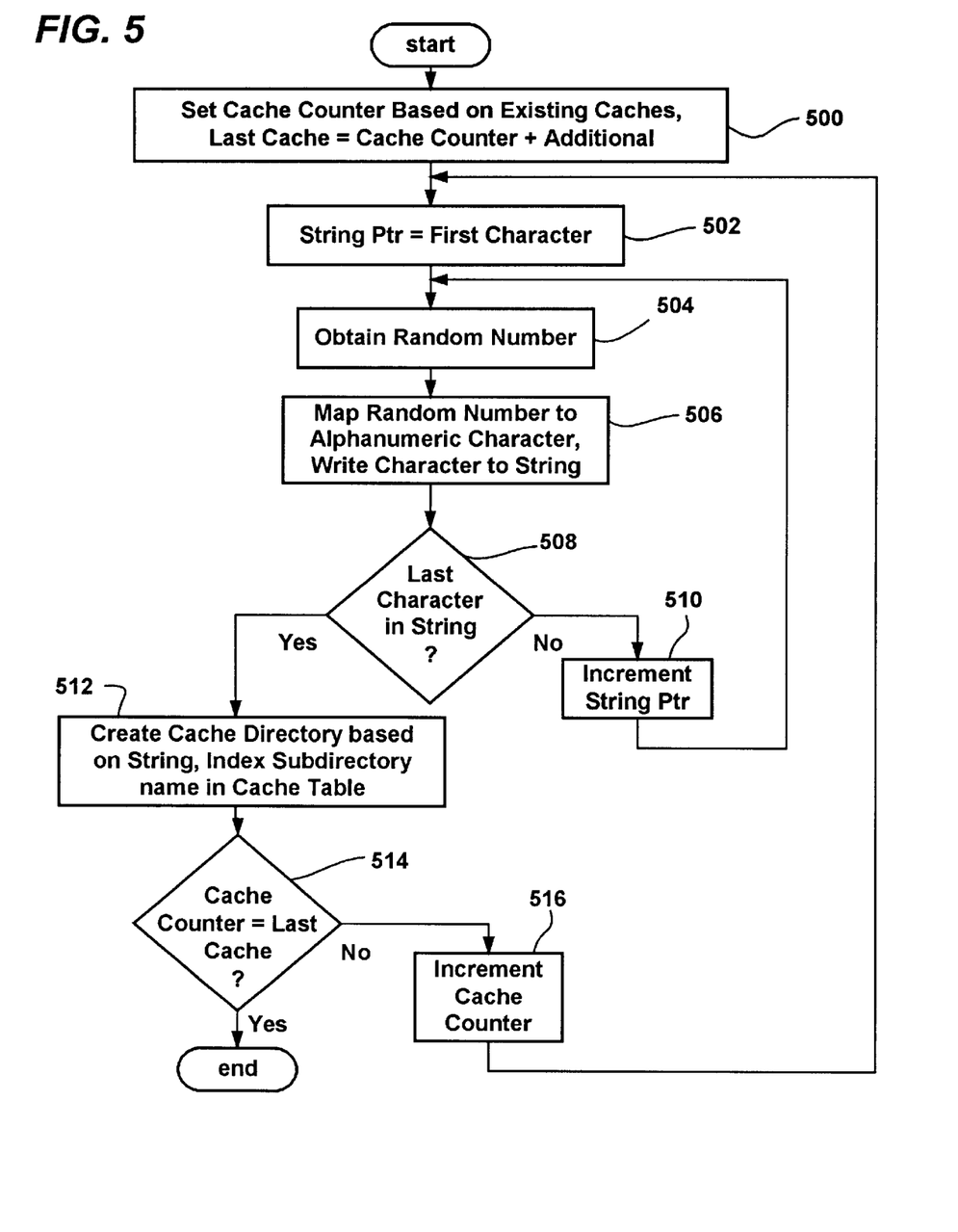
FIG. 5 is a flow diagram generally representing the steps taken for generating random subdirectory names and creating cache directories therefrom.

More particularly, as generally represented in the flow diagram of FIG. 5 beginning at step 500, the subdirectory name generator component 74 accesses the cache table 78 to determine how many indexed cache subdirectories already exist, (if any), and sets a starting cache count based on this number. For example, the first time one or more caches are created, none exist, whereby the cache count is set to zero, while if caches zero to three are already indexed, the cache count is set to four. Also at step 500, the subdirectory name generator component 74 determines the last cache (index) number to create based on the additional number of cache subdirectories desired. At present, for purposes of efficiency, cache subdirectories are created four at a time, whereby if no caches exist, the last cache number is set to three, while if four caches (zero through three) already exist, the last cache number will be seven at step 500. Moreover, although not shown in FIG. 5, if the number of cache subdirectories exceed some predetermined value, (e.g., sixty-four), the subdirectory name generator component 74 may decide not to create any additional caches.

At step 502, a pointer is set to point to the first character in a string that will ultimately become the name of the subdirectory. The string is preferably eight characters in length, (for efficiency purposes with certain file systems), but alternatively may be eight characters plus a three-character extension, or some other number of characters. An even larger number of permutations could be generated by using longer directory names or using nested subdirectories, (and in particular, although not necessarily, nested subdirectories that are also randomly named), for example "FDSWOSI\SFW2HN54". Moreover, note that the cache directory is still randomly named as long as the cache directory name is based on some generated random subdirectory name or part thereof, since such a modified random subdirectory name is also a random subdirectory name. For example, if the string "H93UGUB1" is randomly generated, then as long as the cache directory name includes in its path some or all of the name (e.g., \H93UGUB1-1, \H93UGUB1-2, or \3UGU), the cache directory name is still random. Indeed, although not necessary to the present invention, the length of the string may itself be randomly generated, such as to be anywhere between five and eight characters. For purposes of the present example, eight character subdirectory names, with no extension, will be used.

In keeping with the present invention, at step 504, a random number is obtained from the random number generator 80. At present, the random number that is generated (including any necessary conversion, such as via multiplication and rounding) is between zero and thirty-five. At step 504, the number is converted to an alphanumeric character and the ASCII character is written into the string. Preferably, a number from zero through nine is converted to an ASCII character value "0" through "9", respectively while a number of ten through thirty-five is converted to an ASCII character value of "A" through "Z", respectively. Thus, if the random number was thirty-three, the character is "X" in ASCII. As can be appreciated, this provides 36[possible character permutations. Step 508 tests if the string is full, i.e., in the present example, if the string contains all eight characters of an eight character name. If not full, the string pointer moves forward at step 510 and the character generation process of steps 504–506 are repeated.

Eventually, the string will be full and step 508 will branch to step 512 wherein the cache directory will be created from the randomized string using an appropriate file system API or the like. Also at step 512, the random subdirectory name (the string "XDF53GBI") is indexed based on the value of the cache counter, i.e., at location zero, as represented in the exemplary cache table 78 of FIG. 6. For example, the first cache subdirectory created (indexed by zero) may be named "XDF53GBI", whereby the cache directory may become, for example, "C:\Windows\Temporary Internet Files\XDF53GBI\". Note that the full path need not be indexed as long as the folders that make up the preceding portion of the path are the same for all of the caches $66_1$–$66_n$. As can be readily appreciated, such a full pathname is highly unlikely to be guessed by a remote site, thus solving the security problem that arises when the cache location and filename is known, as described above. Note that if an error occurs in creating the subdirectory, the error may be handled at this time. For example, if by (the very unlikely) chance the named subdirectory already exists, the indexing sub-step may be skipped and the cache counter may be decremented (not shown), whereby another random subdirectory would be created in its place. However, since at least one cache subdirectory would have to already exist to generate such an error, after the indexing sub-step is skipped, the error otherwise may be essentially ignored, since it does not (practically) matter how many unique cache subdirectories are actually created at a given time.

Step 514 then determines whether all desired cache subdirectories have been created. If so, the cache subdirectories have been created and indexed, and the name generation process ends. If not, the cache count is incremented at step 516 and the process repeated for a new string by returning to step 502.

Figure 6:
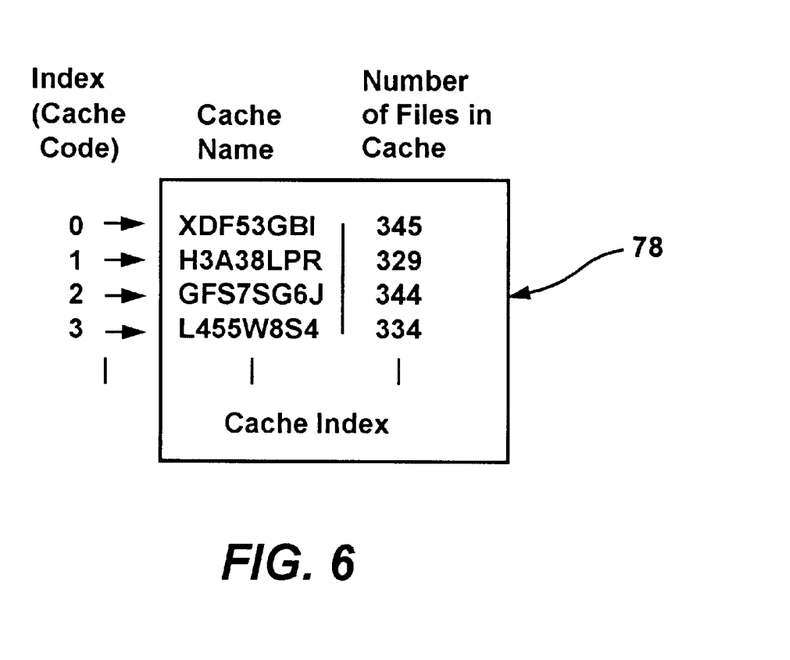
FIG. 6 is a representation of an indexed table maintained for locating cache subdirectory names and a count of the number of files in each corresponding cache directory.

Although not necessary to the invention, for purposes of efficiency the cache manager 64 may further include a cache balancing mechanism 76 to distribute the content to be cached among the caches $70_1$–$70_n$ and/or create additional caches as necessary. Note that the performance of certain file systems begins to degrade when more than a certain number of files (e.g., one-thousand) are in the same subdirectory, and thus the balancing mechanism 76 operates to avoid such a situation. To this end, the balancing mechanism 76 tracks the number of files in each directory and determines in which cache a server's downloaded content should be cached. At the same time, the balancing mechanism 76 may use the count to determine whether the existing caches have enough files, and thus whether more caches need to be created. As shown in FIG. 6, the count may be maintained as a field in the cache table 78. Note that the balancing mechanism 76 described herein caches a server's content in one or more files in the same cache subdirectory. As can be appreciated, however, the balancing mechanism 76 may, for example, alternatively distribute the files from a given server's content among the various caches.

Figure 7:
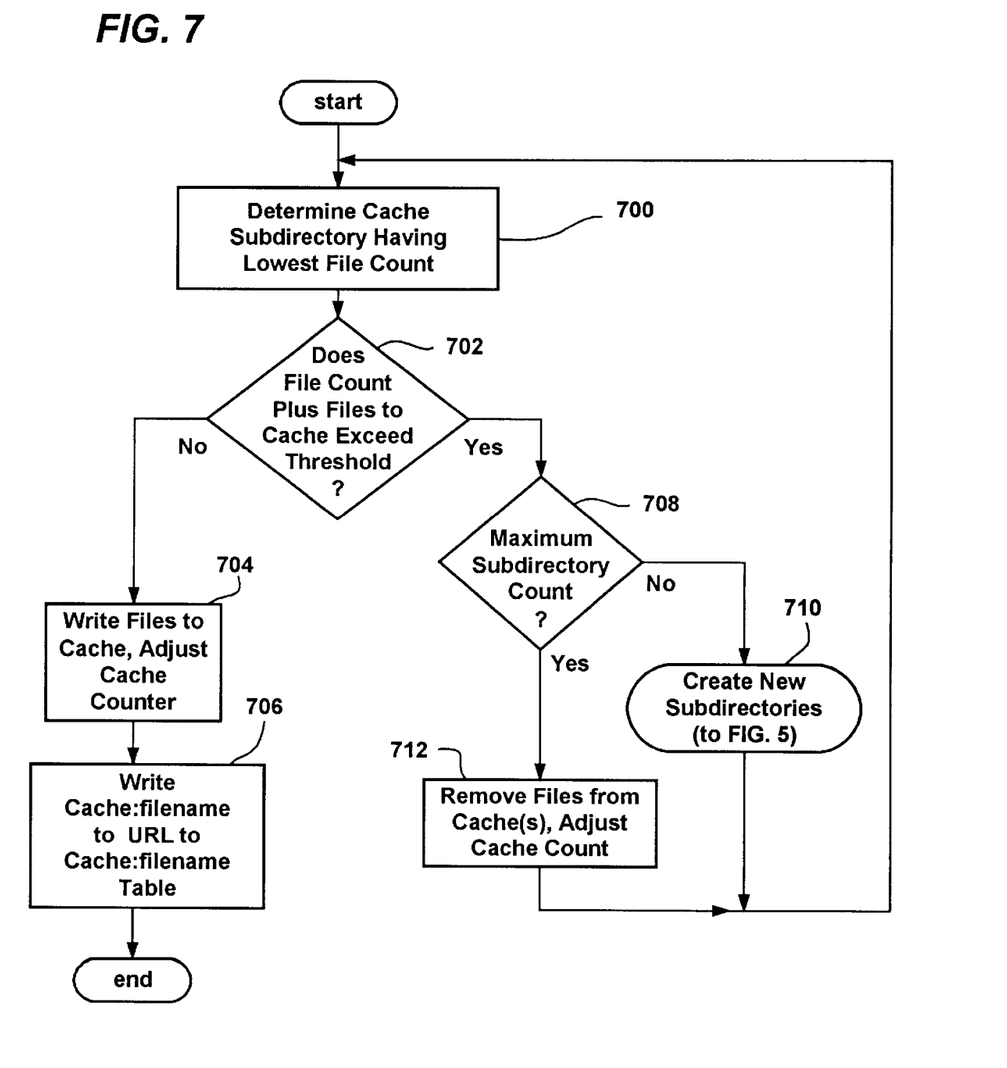
FIG. 7 is a flow diagram generally representing the logic for balancing files among cache subdirectories.

FIG. 7 shows exemplary logic for the balancing mechanism 78, which operates when a server's files are to be cached. Beginning at step 700, the balancing mechanism 76 walks through the index and determines which cache has the lowest number of files therein. In the present example shown in FIG. 6, the cache with an index of one corresponding to the subdirectory named "H3A38LPR" has the least number (329) of files, and thus this cache is selected. If the number of files in this cache plus the number to be cached is below some predetermined threshold amount of files (e.g., one-thousand) then step 702 branches to step 704 where the server's files are downloaded to the cache (e.g., "C:\Windows\Temporary Internet Files\H3A38LPR") and the count of files in the cache table 78 increased to reflect the new number of files therein. As can be appreciated, in this manner, the mechanism 76 distributes the files among the various caches based on the subdirectory that has the least number of files thereunder. Step 708 stores the cache:filename in the URL to cache:filename table 70 so that the location of the cached file may be quickly determined from its server reference. Note that to efficiently store the name, the cache subdirectory is identified by its index rather than by its eight-character subdirectory name or full cache directory path name.

If instead at step 702 the number of files in the selected cache plus the number to be cached exceeds the predetermined threshold amount, step 702 branches to step 706 to determine if more caches (subdirectories) may be created. Step 706 compares the number of cache subdirectories against some predetermined maximum number (e.g., sixty-four), and if the number is below this value, the balancing process 76 branches to step 708. Step 708 creates the new subdirectories (e.g., by invoking the subdirectory name generator 72 which executes the steps of FIG. 5), and returns to step 700 where one of the new, empty caches are selected. If no more subdirectories may be created at step 706, then step 710 is executed, for example, to remove files from existing caches (such as those which have not been accessed for the longest time). Note that a similar-such removal of files from a cache is a well-known operation when the total space allocated for caching files becomes filled up. However, unlike simple space-based removal, in addition to removing the files, step 710 also appropriately reduces the file count maintained in the cache index 78. Note that in step 710, the cache and number of files to remove therefrom may be based on an algorithm, e.g., remove a number m of the least-recently accessed files from the cache having the largest amount of files therein, where m is the number of new files to be cached.

Lastly, it should be noted that the balancing operation is concerned with the number of files in each cache subdirectory, and not the total size of the files in each subdirectory. Moreover, whenever another process modifies the number of files in a cache directory, the corresponding file count in the index 78 need to be appropriately adjusted.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system, a method of storing content in a cache, the method comprising:

generating at least one subdirectory name that is random, wherein said at least one subdirectory name is highly unlikely to be guessed by a site remote to the system;

for each random subdirectory name, creating a randomly-named cache directory corresponding to a cache based on the random subdirectory name;

downloading content from a server;

determining a predictable filename for the downloaded content; and storing the content as a file named with the predictable filename in at least one randomly-named cache directory.

2. The method of claim 1 wherein at least two random subdirectory names are generated, providing a plurality of randomly-named cache directories.

3. The method of claim 1 further comprising maintaining an indexed table including each random subdirectory name therein.

4. The method of claim 2 further comprising downloading content from a plurality of network servers, and balancing the storing of the content among each of the randomly-named cache directories corresponding to a cache.

5. The method of claim 4 wherein balancing the storing of the content includes determining which of the randomly-named cache directories has a least number of files therein.

6. The method of claim 5 wherein determining which of the randomly-named cache directories has the least number of files includes maintaining a file count in association with each cache directory, each file count corresponding to a number of files in the cache directory associated therewith.

7. The method of claim 6 wherein maintaining each file count includes storing information in the indexed table that includes each random subdirectory name.

8. The method of claim 5 further comprising comparing a number of files in the cache directory having the least number of files therein against a predetermined threshold value, and based on the comparison, generating at least one additional random subdirectory name, and for each additional random subdirectory name, creating an additional random cache directory based thereon.

9. The method of claim 1 wherein determining a predictable filename for the downloaded content includes converting a server content reference to the predictable filename.

10. The method of claim 9 further comprising
maintaining a table including server content references and filenames converted therefrom.

11. The method of claim 9 further comprising:
maintaining an indexed subdirectory table including each random subdirectory name therein; and maintaining a table including server content references and corresponding file locations, and wherein the file location associated with each server content reference includes an index to the randomly-named cache directory under which the corresponding file is stored and the filename converted from that reference.

12. The method of claim 1 wherein downloading content from a server comprises accessing a network site.

13. The method of claim 2 wherein creating a randomly-named cache directory includes creating the cache directory as a nested subdirectory based on the at least two random subdirectory names.

14. In a computer system, a system for caching downloaded content in a file of a file system, comprising a random generator, a name-generation mechanism connected to the random generator to generate a subdirectory name that is random, wherein said subdirectory name is highly unlikely to be guessed by a site remote to the system, the name-generation mechanism being connected via an interface to the file system to create a randomly-named cache directory based on the random subdirectory name, and a mechanism configured to determine a predictable filename for the downloaded content and to store the downloaded content as a file with the predictable filename in the randomly-named cache directory of the file system.

15. The system of claim 14 wherein the name-generation mechanism generates at least one other random subdirectory name corresponding to at least one other cache to provide a plurality of random subdirectory names, and wherein the name-generation mechanism creates a randomly-named cache directory for each other random subdirectory name generated thereby, to provide a plurality of randomly-named cache directories.

16. The system of claim 15 further comprising an indexed table including the random subdirectory names therein.

17. The system of claim 15 wherein content is downloaded from a plurality of network servers, and further comprising a balancing mechanism for distributing the content among each of the randomly-named cache directories.

18. The system of claim 17 further comprising an indexed table including the random subdirectory names therein and a count of a number of files in each cache directory, and wherein the balancing mechanism accesses the indexed table to determine which of the cache directories has a least number of files therein and writes at least one file of a server's downloaded content into that cache directory.

19. The system of claim 17 wherein the balancing mechanism communicates with the name-generation mechanism to generate at least one additional random subdirectory name, and a cache directory for each additional random subdirectory name.

20. The system of claim 14 further comprising a table of server content references and corresponding file locations each including one of the predictable filenames.

21. The system of claim 14 wherein the name-generation mechanism generates at least two random subdirectory names and creates the randomly-named cache directory based on at least two of the random subdirectory names in a nested relationship.

22. In a computer system, a method of caching content downloaded from servers to a plurality of cache directories, the method comprising:

generating a plurality of subdirectory names, wherein each subdirectory name is random and wherein said each subdirectory name is highly unlikely to be guessed by a site remote to the system;

creating a randomly-named cache directory for said each random subdirectory name generated;

downloading content from a plurality of servers;

for each distinctly referenced portion of downloaded content, selecting one of the randomly-named cache directories as a selected cache directory, converting a reference for that content to a predictable filename and storing the content as a file having that filename under the selected cache directory.

23. The method of claim 22 wherein selecting one of the randomly named cache directories includes determining which of the randomly named cache directories has a least number of files therein and selecting that cache directory as the selected cache directory.

24. The method of claim 9 wherein the filename includes a name closely matched to the server content reference.

25. A computer-readable medium having computer-executable instructions for performing the method of claim 1.

26. The system of claim 20 wherein the filename includes a name closely matched to the server content reference.

27. The method of claim 22 wherein the filename includes a name closely matched to the server content reference.

28. A computer-readable medium having computer-executable instructions for performing the method of claim 22.

* * * * *